(12) United States Patent
Hellegouarch et al.

(10) Patent No.: US 11,572,833 B2
(45) Date of Patent: Feb. 7, 2023

(54) AIRCRAFT ENGINE ASSEMBLY WITH A SUPPLY PATH TO AN INTER-FLOW COMPARTMENT TANK OF TURBINE ENGINE

(71) Applicant: SAFRAN AIRCRAFT ENGINES, Paris (FR)

(72) Inventors: Antoine Elie Hellegouarch, Moissy-Cramayel (FR); Frédéric Paul Eichstadt, Moissy-Cramayel (FR); Quentin Matthias Emmanuel Garnaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 219 days.

(21) Appl. No.: 17/044,412

(22) PCT Filed: Apr. 2, 2019

(86) PCT No.: PCT/FR2019/050757
§ 371 (c)(1),
(2) Date: Oct. 1, 2020

(87) PCT Pub. No.: WO2019/193274
PCT Pub. Date: Oct. 10, 2019

(65) Prior Publication Data
US 2021/0115852 A1 Apr. 22, 2021

(30) Foreign Application Priority Data
Apr. 4, 2018 (FR) ...................................... 1852926

(51) Int. Cl.
*F02C 7/06* (2006.01)
*B64D 27/12* (2006.01)
(Continued)

(52) U.S. Cl.
CPC ................ *F02C 7/06* (2013.01); *B64D 27/12* (2013.01); *F01D 25/18* (2013.01);
(Continued)

(58) Field of Classification Search
CPC .......................... F02C 7/06; B64D 2027/268
See application file for complete search history.

(56) References Cited

U.S. PATENT DOCUMENTS 5,845,483 A * 12/1998 Petrowicz ............... F02C 7/262
60/788
11,035,294 B2 * 6/2021 Eichstadt .................. F02C 7/32
(Continued)

FOREIGN PATENT DOCUMENTS

| EP | 1170207 A2 | 1/2002 |
| EP | 1908929 A2 | 4/2008 |
| FR | 3046200 A1 | 6/2017 |

OTHER PUBLICATIONS

Search Report issued in French Patent Application No. 1852926 dated Dec. 17, 2018.
(Continued)

*Primary Examiner* — Todd E Manahan
*Assistant Examiner* — Marc J Amar
(74) *Attorney, Agent, or Firm* — Pearne & Gordon LLP

(57) ABSTRACT

An aircraft engine assembly includes a dual-flow turbine engine, a pylon for mounting the turbine engine, thrust-absorbing rods connecting the turbine engine to the pylon, and an inter-flow compartment housing a lubricant tank. In order to facilitate the filling of the tank, a lubricant supply path is fluidly connected to the tank, this path passing through an inner hollow region of at least one of the two thrust-absorbing rods.

10 Claims, 3 Drawing Sheets

(51) Int. Cl.
   *F01M 11/04* (2006.01)
   *F02C 7/20* (2006.01)
   *F02C 7/32* (2006.01)
   *F01D 25/18* (2006.01)
   *B64D 27/26* (2006.01)

(52) U.S. Cl.
   CPC ........... *F01M 11/0458* (2013.01); *F02C 7/20* (2013.01); *F02C 7/32* (2013.01); *B64D 2027/268* (2013.01); *F05D 2260/98* (2013.01)

(56) References Cited

U.S. PATENT DOCUMENTS

| | | | |
|---|---|---|---|
| 11,274,570 B2* | 3/2022 | Edwards | F02C 7/06 |
| 2004/0216461 A1 | 11/2004 | Wallace et al. | |
| 2008/0073154 A1* | 3/2008 | Eleftheriou | F01D 25/18 |
| | | | 184/105.1 |
| 2009/0218006 A1* | 9/2009 | Pisseloup | F01D 25/18 |
| | | | 141/95 |
| 2013/0218399 A1* | 8/2013 | Demaison | F01D 25/18 |
| | | | 701/33.9 |
| 2013/0291514 A1* | 11/2013 | Suciu | F02C 7/12 |
| | | | 60/39.08 |
| 2016/0215654 A1* | 7/2016 | Ancuta | F01D 25/28 |
| 2017/0211412 A1* | 7/2017 | Raimarckers | F01D 21/003 |
| 2018/0283199 A1* | 10/2018 | Karnofski | B64D 27/26 |
| 2019/0338674 A1* | 11/2019 | Edwards | F02C 7/36 |
| 2020/0025033 A1* | 1/2020 | White | F01D 25/20 |

OTHER PUBLICATIONS

International Search Report issued in Application No. PCT/FR2019/050757 dated Jul. 23, 2019.
Written Opinion issued in Application No. PCT/FR2019/050757 dated Jul. 23, 2019.

* cited by examiner

AIRCRAFT ENGINE ASSEMBLY WITH A SUPPLY PATH TO AN INTER-FLOW COMPARTMENT TANK OF TURBINE ENGINE

This is the National Stage of PCT international application PCT/FR2019/050757, filed on Apr. 2, 2019 entitled "AIRCRAFT ENGINE ASSEMBLY WITH A SUPPLY PATH TO AN INTER-FLOW COMPARTMENT TANK OF A TURBINE ENGINE", which claims the priority of French Patent Application No. 1852926 filed Apr. 4, 2018, both of which are incorporated herein by reference in their entirety.

TECHNICAL FIELD

The present invention relates to an aircraft engine assembly, comprising a dual flow turbomachine, an attachment pylon for the turbomachine, as well as connecting means between the turbomachine and the pylon. Conventionally, these connecting means ensure suspension of the turbomachine under the pylon, as well as transmission of thrust towards this same pylon.

The invention more particularly relates to such an engine assembly, in which an inter-flow compartment of the turbomachine accommodates one or more lubricant tanks. A solution of this type is for example known from document FR 3 046 200 A1.

STATE OF PRIOR ART

On dual flow turbomachines, a compartment between a primary flow and a secondary flow is actually provided, this compartment being usually called an inter-flow compartment. It accommodates numerous equipments, the accessibility of which is sometimes made difficult due to the high density of these equipments, in a relatively restricted space.

This accessibility problem can be encountered for a lubricant tank arranged in the inter-flow compartment. Indeed, filling the tank sometimes proves tricky, due to the access being difficult in this very dense environment.

There is consequently a need for optimizing existing designs, for the purpose of facilitating filling operations of the tank arranged in the inter-flow compartment.

DISCLOSURE OF THE INVENTION

To meet this need, one object of the invention is an aircraft assembly comprising a dual flow turbomachine as well as an attachment pylon for the turbomachine for ensuring attachment of the turbomachine to a wing element of the aircraft, the assembly including thrust load pick-up rods interconnecting the turbomachine to the pylon, the turbomachine having an inter-flow compartment accommodating at least one lubricant tank.

According to the invention, the assembly has a lubricant supply path fluidly interconnected to the tank, said path passing through a hollow internal zone of at least one of both thrust load pick-up rods.

The invention thus cleverly meets the expressed need, by imparting to at least one of both thrust load pick-up rods an additional function of aiding in filling the tank. Indeed, by making sure that the lubricant supply path passes through the hollow internal zone of the concerned rod, filling the tank can be advantageously made from the back of this rod, that is from a lower-size zone located at a distance from the inter-flow compartment. Filling is thereby easier for the operator, but without requiring significant changes in present designs. On the contrary, one of the advantages of the invention lies in the use of existing rods to ensure filling.

The invention preferably provides at least one of the following optional characteristics, taken individually or in combination.

The lubricant tank is located upstream of a high pressure spool of the turbomachine, and preferably around a low pressure compressor belonging to a low pressure spool of the turbomachine.

A front end of the thrust load pick-up rods is connected to an intermediate casing of the turbomachine, or to a stator element of the turbomachine located downstream of the intermediate casing. This stator element can for example take the form of an annular structure fastened to the intermediate casing, and being located in the inter-flow compartment, downstream of this intermediate casing.

A rear end of the thrust load pick-up rods is arranged flush with a gas exhaust casing of the turbomachine. Nevertheless, this rear end could be located upstream or downstream of the gas exhaust casing, without departing from the scope of the invention.

According to a first preferred embodiment, the lubricant supply path is partly defined by a preferably flexible connector duct, connecting the lubricant tank to a front end of the thrust load pick-up rod, the lubricant supply path being then also partly defined by said hollow internal zone extending between the front end and a rear end of this rod. In this embodiment, the front end of the thrust load pick-up rod preferably includes a lubricant outlet port to which said connector duct is connected, and this front end includes a fork having two lugs between which the lubricant outlet port opens.

According to a second preferred embodiment, the lubricant supply path is partly defined by a supply duct at least partly passing through said hollow internal zone of the rod, and preferably by passing through the entirety of it.

Irrespective of the embodiment contemplated, the assembly preferably includes lubricant one-way means arranged along the lubricant supply path, downstream of the thrust load pick-up rod. This avoids risks of the rod remaining full of lubricant during part of the flight.

Finally, the lubricant tank is preferentially fitted with a lubricant level gauge system, and the assembly further comprises a fill indicator offset from the tank, and receiving signals emitted by the gauge system. This indicator enables the operator to gain access to the information regarding the tank level more easily, when filling is performed at a distance therefrom.

One object of the invention is also a method for filling a lubricant tank of such an assembly, implemented by injecting lubricant via the supply path passing through the hollow internal zone of at least one of both thrust load pick-up rods.

Further advantages and characteristics of the invention will appear in the non-limiting detailed description below.

BRIEF DESCRIPTION OF THE DRAWINGS

This description will be made with reference to the accompanying drawings among which.

DETAILED DISCLOSURE OF PREFERRED EMBODIMENTS

Figure 1:
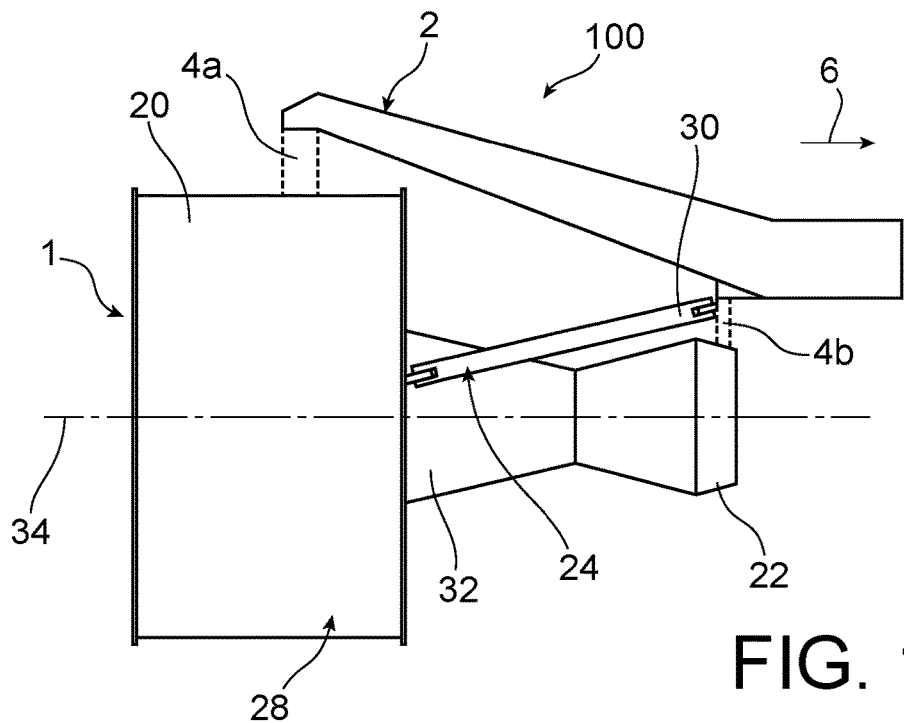
FIG. 1 represents a schematic side view of an aircraft engine assembly, according to the invention.

With reference to FIG. 1, it is represented an aircraft engine assembly 100, according to the invention. This assembly 100 includes a dual flow turbomachine 1, an attachment pylon 2 for the turbomachine, as well as connecting means between the turbomachine and the pylon.

Throughout the following description, by convention, the terms "upstream" and "downstream" are to be considered relative to a main flow direction of gases through the turbomachine, this direction being schematically represented by the arrow 6. Furthermore, the terms "front" and "rear" are to be considered relative to an opposite direction, corresponding to a direction of travel of the aircraft as a result of the thrust exerted by the turbomachine.

The pylon 2 is for ensuring attachment of the turbomachine 1 to a wing element of the aircraft (not represented), and preferably under a wing of this aircraft. In FIG. 1, only a primary structure of the pylon has been represented. Also called rigid structure, this primary structure enables static or dynamic loads generated by the turbomachine to be transmitted to the wing box. The other constituent elements not represented of the pylon 2, of the secondary structure type ensuring segregation and holding of systems while supporting aerodynamic fairings, are similar conventional elements known from prior art.

The pylon 2 is thus vertically sandwiched between the dual flow turbomachine 1, and the wing element of the aircraft. The connecting means between this pylon and the turbomachine have distinct functions. First, suspensions for the turbomachine are provided, for example a front engine mount 4a as well as a rear engine mount 4b. These two mounts 4a, 4b for example interconnect the primary structure of the pylon 2 to a fan casing 20 of the turbomachine, and to a gas exhaust casing 22, respectively. Alternatively, the front engine mount 4a can be fastened to an intermediate casing 28 of the turbomachine, located between the fan casing 20 and a central casing 32, also called core casing.

Moreover, these connecting means include two thrust load pick-up rods 24 (only one being visible in the side view of FIG. 1). These rods 24 are dedicating to transmitting motive thrust loads towards the pylon 2. They are arranged symmetrically relative to a median vertical plane of the engine assembly 100. Each of them has a front end 26 connected to the intermediate casing 28 of the turbomachine or to another stator element arranged downstream of this casing 28, as well as a rear end 30 connected to the rear engine mount 4b, or in proximity thereto and directly to the primary structure of the pylon 2.

Figure 2:
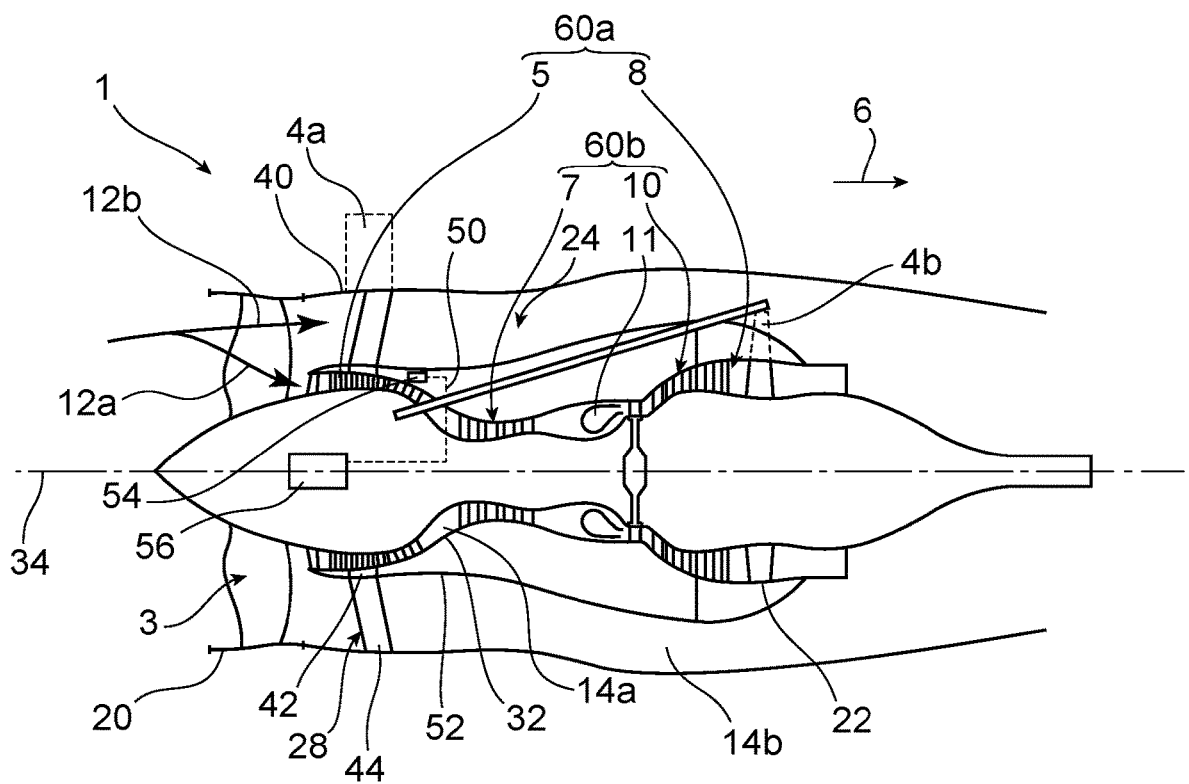
FIG. 2 represents a longitudinal cross-section view showing in further detail the turbomachine fitting the assembly shown in the previous figure.

FIG. 2 represents a more detailed view of the turbomachine 1, with a longitudinal central axis 34. It is here a twin spool dual flow turbine engine. The turbomachine 1 comprises, from upstream to downstream along the main flow direction 6 of gases, a fan 3, a low pressure compressor 5, a high pressure compressor 7, a combustion chamber 11, a high pressure turbine 10 and a low pressure turbine 8.

Conventionally, after passing through the fan, air is divided into a central primary stream 12a and a secondary stream 12b which surrounds the primary stream. The primary stream 12a flows into a main airflow 14a for circulating gases passing through the compressors 5, 7, the combustion chamber 11, and the turbines 10, 8. The secondary stream 12b flows in turn into a secondary air flow 14b outwardly radially delimited by the fan casing 20, upstream of the turbomachine. This delimitation is continued downstream by an intermediate casing outer shroud 40, fastened to the rear end of the fan casing 20. In this respect, it is noted that conventionally, the intermediate casing 28 not only has the shroud 40, but also a hub 42, as well as radial arms 44 interconnecting the hub 42 to the outer shroud 40. The hub 42 is interconnected to the central casing 32, which extends downstream from this hub. The latter forms an upstream delimitation of an inter-flow compartment 50, accommodating a plurality of equipments. The compartment 50 is thus radially inwardly delimited by the central casing 32, and radially outwards by one or more cowlings 52 forming the inner delimitation of the secondary airflow 14b.

On the numerous equipments accommodated in the upstream part of the inter-flow compartment 50, only one lubricant tank 54 has been represented, and this for the sake of clarity of the figure. This tank 54 is for supplying lubricant to the surrounding elements, via one or more pumps also accommodated in the compartment 50. It is especially the case for a reduction gear 56, driven by a low pressure spool 60a comprising the compressor 5 and the turbine 8. Conventionally, the low pressure spool 60a is added to a high pressure spool 60b including the compressor 7 and the turbine 10. The reduction gear 56 is in turn provided to drive the fan 3, so that the latter rotates at a speed of rotation lower than that of the low pressure spool 60a.

Figure 3:
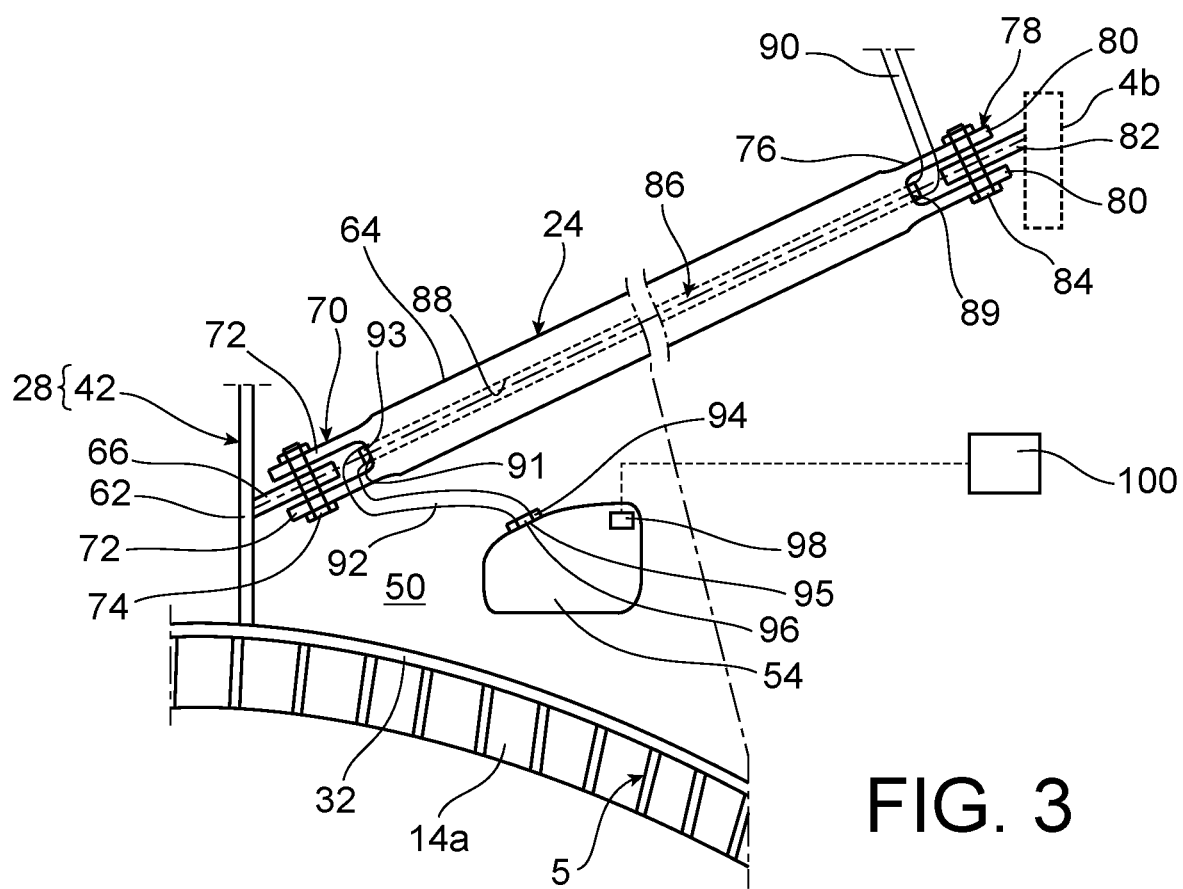
FIG. 3 represents an enlarged cross-section view of part of the turbomachine shown in the previous figure, in cooperation with one of the thrust load pick-up rod, according to one first preferred embodiment of the invention.
Figure 3A:
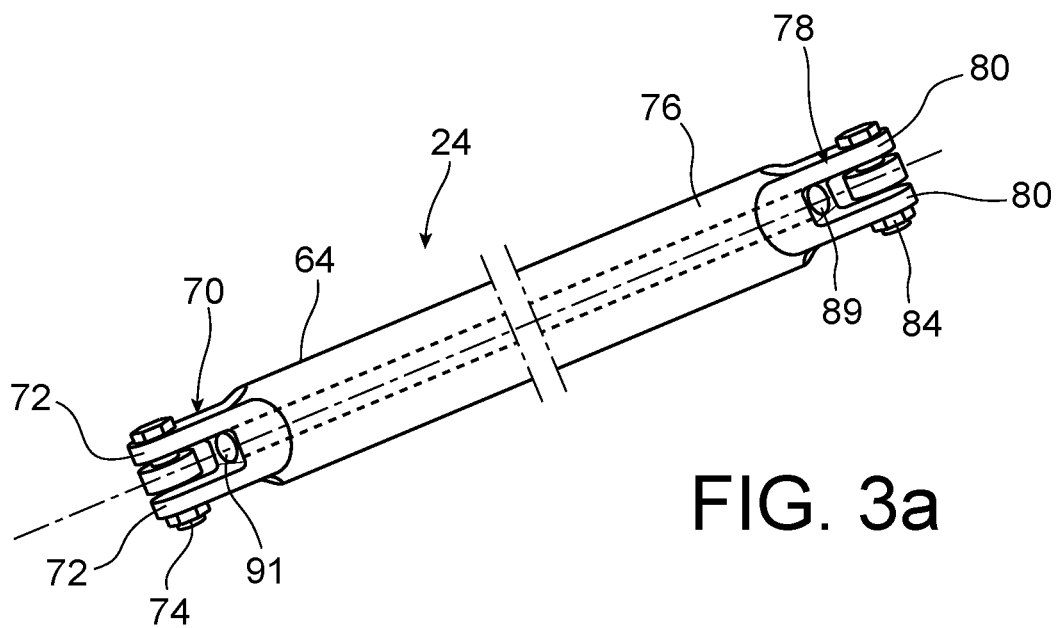
FIG. 3a represents a perspective view of the rod shown in the previous figure.

With reference now to FIGS. 3 and 3a, the lubricant tank 54 is located close to a downstream flange 62 of the intermediate casing hub 42. In the inter-flow compartment 50, the tank 54 is arranged at the low pressure compressor 5, meaning that along the longitudinal axis of the turbomachine, the tank occupies a space located in an axial section of the turbomachine which corresponds to the axial occupation of the low pressure compressor, upstream of the high pressure spool 60b. The tank 54 can be partially annular, meaning that it extends over part of the circumference around the low pressure compressor 5, analogously to the lubricant tank described in document FR 3 046 200 A1. The radial size of the tank can thus be limited, without compromising capacity.

It is to the flange 62 that a front end 64 of each thrust load pick-up rod 24 is connected, by being hinged, preferably via a ball joint (not represented), to a fitting 66 integral with this flange 62. The front end 64 of the rod includes a fork 70 both lugs 72 of which are located on either side of the fitting 66, since a hinge axis 74 carrying the bowl joint passes through them.

Analogously, a rear end 76 of the rod 24 includes a fork 78 both lugs 80 of which are located on either side of a rudder bar 82, itself mounted on the rear engine mount 4b. A hinge axis 84, preferably bearing a bowl joint (not represented), passes through the rudder bar 82 as well as both lugs of the fork 80. Thus, this rear end 76 is located flush with the gas exhaust casing represented in FIG. 1, by being located higher than the front end of the rod.

One of the features of the invention lies in that a lubricant supply path 86 fluidly interconnected to the tank 54 is provided, in order to be able to fill the latter at a distance therefrom. Moreover, this path 86 passes through a hollow internal zone 88 of at least one of both rods 24, and preferably through the zone 88 of one of both rods only, which is thus functionalised particularly cleverly.

More precisely, in this first preferred embodiment, the path 86 begins at a lubricant inlet port 89, opening into the rear end 76 of the rod 24, between both fork lugs 80. Possibly, the path 86 begins still more upstream, for example by a flexible duct 90 connected to the inlet port 89. This duct 90 can ensure a fluid connection between the rod 24 and part of the pylon. It is for example configured so as to be able to cooperate at its opposite end with a filling cup (not represented).

Consequently, when an operator wants to fill the tank 54, he/she injects lubricant through the inlet port 89 of the rod 24, or even through a member located more upstream, such as a filling cup communicating with this port 89. Opposite to this port, the front end 64 of the rod includes an outlet port 91 opening between both fork lugs 72. The hollow internal zone 88 extends between these two ports 89, 91, by forming a passageway thus extending all along the rod, preferably by being centred on an axis thereof. For example, the cross-section of this passageway can be circular, as represented in FIGS. 3 and 3a. In this first preferred embodiment, it is the hollow internal zone 88 which itself defines part of the lubricant supply path 86.

This path 86 is also defined by a flexible connector duct 92, one end of which is connected to the outlet port 91 of the rod, for example via a screwed connector 93 or a similar element. This duct 92 can be curved in the restricted zone delimited between the outlet port 91 and the hinge axis 74, in order to be extracted from this zone by running between both fork lugs 72, to then extend towards the tank 54. Indeed, at an opposite end of this duct 92, another connector 94 enables it to be fastened to a filling port 95 provided on the tank. The path 86 is thus terminated by this other connector 94, which enables a one-way valve 96 to be integrated in order to avoid possible rise of lubricant in the path 86, upon operating the turbomachine. The valve 96, or any other analogous means, can be arranged elsewhere along the path 86, preferably downstream of the outlet port 91 provided on the rod.

Upon filling the tank 54, the operator injects lubricant through the inlet of the path 86 so that it then flows by gravity into the hollow internal zone 88, and then in the connector duct 92 up to the tank 54 located at a distance from the operator. To improve control of this filling, the tank is fitted with a lubricant level gauge system 98, which communicates through a wireless connection with a fill indicator offset from the tank. This indicator 100 is preferably offset downstream, for example in proximity to the inlet port 89 of the rod, in order to best inform the operator about the filling level of the tank. The indicator 100 receives signals emitted by the gauge system 98, and itself emits at least one signal informing the operator about the filling level. It can be an end-of-filling audible signal, or simply an offset display for the filling level.

Figure 4:
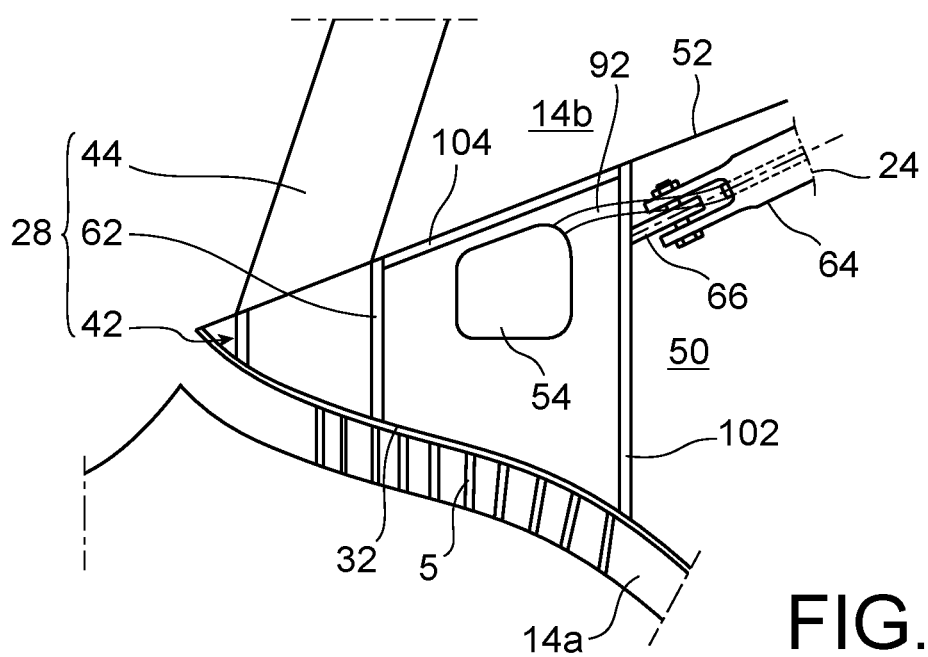
FIG. 4 represents a view similar to that of FIG. 3, showing an alternative embodiment.

According to an alternative embodiment shown in FIG. 4, the front end 64 of each rod 24 is not directly connected to the downstream flange 62 of the intermediate casing hub 42, but mounted to a downstream offset stator element. It is here a ring 102 centred to the axis of the turbomachine, and accommodated into the inter-flow compartment 50 downstream of the tank 54. The inner periphery of the ring 102 is fastened to the central casing 32, and its outer periphery is interconnected by axial arms 104 to the downstream flange 62.

It is thereby this stator ring 102 which carries the fitting 66, to which the front end 64 of the rod 24 is hinged.

Figure 5:
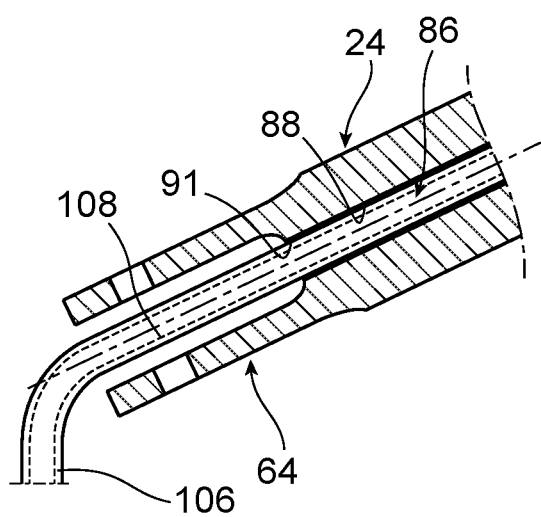
FIG. 5 represents a side view of part of the rod shown in the previous figures, for falling into a second preferred embodiment of the invention.

Finally, FIG. 5 represents a second preferred embodiment, in which the lubricant supply path 86 is defined by a supply duct 106 which passes through at least part of the hollow internal zone 88 of the rod 24, and preferably this whole zone. Thus, a connector is no longer provided at the outlet port 91 of the rod, since the supply duct 106 can be continued downstream, for example up to the tank. On the opposite side, this duct 106 extends up to the inlet port of the zone 88, or beyond this port. At the rod 24, the lubricant supply path 86 is therefore no longer defined by the wall of the hollow internal zone 88, but by the internal passageway 108 of the supply duct 106 passing through this same zone 88.

Of course, various modifications can be brought by those skilled in the art to the invention just described, only by way of non-limiting examples, and the scope of which is defined by the appended claims.

What is claimed is:

1. An aircraft engine assembly comprising:
   a dual flow turbomachine as well as an attachment pylon for the turbomachine for attaching the turbomachine to a wing element of an aircraft, the assembly including at least one thrust load pick-up rod interconnecting the turbomachine to the pylon, the turbomachine having an inter-flow compartment accommodating at least one lubricant tank,
   wherein the assembly has a lubricant supply path fluidly interconnected to the tank, said path passing through a hollow internal zone of the at least one thrust load pick-up rod, and
   wherein the lubricant supply path is partly defined by a connector duct, connecting the lubricant tank to a front end of the at least one thrust load pick-up rod, and wherein the lubricant supply path is also partly defined by said hollow internal zone extending between the front end and a rear end of the at least one thrust load pick-up rod.

2. The assembly according to claim 1, wherein the lubricant tank is located upstream of a high pressure spool of the turbomachine.

3. The assembly according to claim 2, wherein the lubricant tank is located at a low pressure compressor belonging to a low pressure spool of the turbomachine.

4. The assembly according to claim 1, wherein a front end of the at least one thrust load pick-up rod is connected to an intermediate casing of the turbomachine, or to a stator element of the turbomachine located downstream of the intermediate casing.

5. The assembly according to claim 1, wherein a rear end of the at least one thrust load pick-up rod is arranged flush with a gas exhaust casing of the turbomachine.

6. The assembly according to claim 1, wherein the front end of the at least one thrust load pick-up rod includes a lubricant outlet port to which said connector duct is connected, and wherein this front end includes a fork having two lugs between which the lubricant outlet port opens.

7. The assembly according to claim 1, wherein the lubricant supply path is partly defined by a supply duct at least partly passing through said hollow internal zone of the at least one thrust load pick-up rod.

8. The assembly according to claim 1, wherein the lubricant tank is fitted with a lubricant level gauge system, and wherein the assembly further comprises a fill indicator offset from the tank, and receiving signals emitted by the gauge system.

9. A method for filling a lubricant tank of an assembly according to claim 1, the method comprising injecting lubricant via the supply path passing through the hollow internal zone of the at least one thrust load pick-up rod.

10. The assembly according to claim 1, wherein the connector duct is flexible.

* * * * *